Patented May 11, 1948

2,441,183

UNITED STATES PATENT OFFICE 2,441,183

HEXAHYDROBENZYL ESTER

Joseph E. Bludworth and Donald P. Easter, Cumberland, Md., assignors to Celanese Corporation of America, a corporation of Delaware No Drawing. Original application January 22, 1944, Serial No. 519,353. Divided and this application December 18, 1944, Serial No. 568,783

1 Claim. (Cl. 260—468)

This invention relates to novel organic compounds and relates more particularly to certain esters of hexahydrobenzyl alcohol.

This application is a division of United States application S. No. 519,353, filed January 22, 1944, now Patent No. 2,410,008.

An object of our invention is the preparation of certain esters of hexahydrobenzyl alcohol.

Another object of our invention is the preparation of esters of hexahydrobenzyl alcohol which are useful in various commercial applications due to their plasticizing, surface active and other properties.

Other objects of our invention will appear from the following detailed description.

As is well known, the Diels-Alder condensation of acrolein with butadiene yields $\Delta^3$-tetrahydrobenzaldehyde

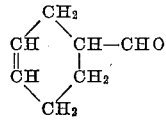

This unsaturated cyclic aldehyde is a highly reactive starting material for the development of new and valuable organic compounds. On oxidation of the above aldehyde, there may be obtained $\Delta^3$-tetrahydrobenzoic acid

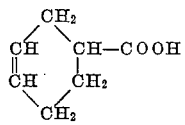

which, when hydrogenated, yields hexahydrobenzoic acid

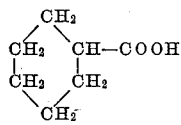

On hydrogenation of $\Delta^3$-tetrahydrobenzaldehyde, hexahydrobenzyl alcohol

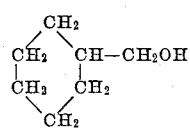

is obtained.

We have now discovered that the esters of hexahydrobenzyl alcohol of the following general formula

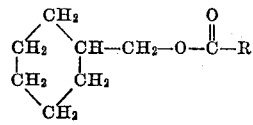

wherein R is a substituted or unsubstituted cyclic radical, form a valuable series of organic compounds which are suitable for use as plasticizers, waxes, synthetic intermediates, binding agents, solvents or lubricants. As examples of suitable acids with which the hexahydrobenzyl alcohol may be esterified to form said valuable esters, there may be mentioned $\Delta^3$-tetrahydrobenzoic acid, hexahydrobenzoic acid, naphthoic acid and tetrahydronaphthoic acid.

The novel esters of our invention may be prepared by reacting hexahydrobenzyl alcohol with the desired acid or acid anhydride, preferably, in the presence of a suitable esterification catalyst such as anhydrous hydrogen chloride, sulfuric acid or p-toluene sulfonic acid. From 1 to 2 equivalents of hexahydrobenzyl alcohol are reacted with from 1 to 2 equivalents of acid or anhydride. The esterification may be effected without the application of external heat by mixing the hexahydrobenzyl alcohol with the desired acid, and then bubbling dry hydrogen chloride through the mixture until the reaction is completed. The completion of the reaction is indicated by the fact that no further heat is evolved from the reaction mixture. The product may be separated from the reaction mixture by distillation, extraction, crystallization or like method, or by a combination of those methods which are usually employed for the separation of pure compounds from reaction mixtures in which they are prepared.

In order further to illustrate our invention but without being limited thereto the following example is given:

*Example*

50 parts by weight of hexahydrobenzyl alcohol and 55 parts by weight of $\Delta^3$-tetrahydrobenzoic acid are mixed together and dry hydrogen chloride bubbled through the mixture. The hydrogen chloride is bubbled through until further evolution of heat ceases. The resulting reaction mixture is distilled under high vacuum and hexahydrobenzyl-$\Delta^3$-tetrahydrobenzoate is removed in the fraction boiling at 112 to 114° C. under a pressure of 8 mm. of mercury. The yield obtained is 88% of theoretical.

It is to be understood that the foregoing detailed description is given merely by way of illustration and that many variations may be made therein without departing from the spirit of our invention.

Having described our invention, what we desire to secure by Letters Patent is:

Hexahydrobenzyl-$\Delta^3$-tetrahydrobenzoate.

JOSEPH E. BLUDWORTH.
DONALD P. EASTER.

REFERENCES CITED

The following references are of record in the file of this patent:

UNITED STATES PATENTS

| Number | Name | Date |
|---|---|---|
| 1,697,295 | Van Schaack | Jan. 1, 1929 |
| 1,850,144 | Stolz et al. | Mar. 22, 1932 |
| 2,015,088 | Reid | Sept. 24, 1935 |
| 2,016,392 | Schneider | Oct. 8, 1935 |
| 2,047,663 | Barrett (I) | July 14, 1936 |
| 2,047,664 | Barrett (II) | July 14, 1936 |
| 2,063,144 | Barrett (III) | Dec. 8, 1936 |

OTHER REFERENCES

Silberberg, "Annalen der Chemie," vol. 327, pages 193 to 200.